United States Patent Office 3,640,987
Patented Feb. 8, 1972

3,640,987
PROCESS FOR MANUFACTURING TITANIUM TRICHLORIDE, THE CATALYSTS OBTAINED THEREFROM AND THEIR USES IN THE POLYMERIZATION OF POLYMERIZABLE MONOMERS
Nhu Hung Phung, Antony, and Gilles Le Febvre, La Celle St. Cloud, France, assignors to Institut Francais du Petrole des Carburants et Lubrifiants, Hauts-de-Seine, France
No Drawing. Filed June 3, 1968, Ser. No. 804,722
Claims priority, application France, June 1, 1967, 108,822
Int. Cl. C08f 1/42, 3/10
U.S. Cl. 260—93.7    11 Claims

ABSTRACT OF THE DISCLOSURE

The present disclosure is directed to a process for manufacturing titanium trichloride by reducing titanium tetrachloride utilizing at least one reducing compound of a metal of Groups I to III, in an inert solvent. The process is carried out in two steps, the first step being conducted at a temperature lower than about 50° C. and the second step being conducted at a temperature higher than about 75° C. In the first step, the solvent has a normal boiling point lower than 140° C. and in the second step the solvent has a normal boiling point higher than 140° C.

---

This invention relates to the manufacture of a new type of catalyst exhibiting an increased activity, particularly for the stereospecific polymerization of α-olefins. More particularly this invention relates to a new process for manufacturing highly efficient catalysts which may be used to polymerize propylene and its homologs to solid, highly crystalline polymers of high molecular weights.

It is well known to use catalysts in the stereospecific polymerization, particularly that of α-olefins, said catalysts resulting from reacting compounds of transitional metals with organometal compounds.

Compounds of elements of Group IVa, Va or VIa of the Mendeleev chart are contacted with organometallic compounds or hydrides of metals, the metals in these compounds being chosen from the Groups I, II and III of the said chart.

The transition metal compound may be a halide, for example a titanium tetrachloride, whereas the organometallic compounds are most often organoaluminum compounds.

It is known to manufacture a catalytic system which is able to polymerize the ethylenic hydrocarbons to solid, highly crystalline polymers, by reducing a transition metal compound by means of an organometallic compound so as to constitute, after said reduction, a new compound of the transition metal. For example, titanium trichloride may be obtained by the reduction of titanium tetrachloride.

Titanium trichloride, such as obtained by these processes, is crystalline and exhibits a dark violet color; however, according to the manufacture process and the degree of purity, it exhibits a varying activity in the polymerization of α-olefins.

Several processes are known to obtain $TiCl_3$ by the reduction of $TiCl_4$ by means of organoaluminic compounds. Usually this reduction is carried out on dissolved $TiCl_4$, using inert organic liquids (saturated aliphatic hydrocarbons such as heptane, decane, Vaseline oil, aromatic hydrocarbons such as benzene, xylene, aromatic compounds such as monochlorobenzene, ortho dichlorobenzene and the like).

It is also known to carry out the reduction of $TiCl_4$ in two steps corresponding to different temperature ranges; in the first step, a solution of an organoaluminum compound in a hydrocarbon is added to a solution of $TiCl_4$ in the same hydrocarbon, while the temperature is maintained below 50° C., for example between —30 and +30° C. Once the addition of the organoaluminic compound has come to an end, a second step follows by heating to a temperature higher than about 75° C.

The resulting suspension is maintained at the second step temperature for, say, 1 to 6 hours, although these values are not limitative.

Usually this reduction of $TiCl_4$ is carried out either in a hydrocarbon solvent of high viscosity and boiling point, for example anhydrous Vaseline oil and decahydronaphthalene, and in that case the second step may be practiced at high temperature and atmospheric pressure, without any other change, or in a solvent of low boiling point and reduced viscosity such as heptane, hexane, pentane or butane, the organoaluminic compounds having a higher reducing power in these solvents than in the high-boiling solvents. In this case, a second step follows at about 150° C., under superatmospheric pressure, which is of some trouble for the process.

The process which is an object of this invention makes possible to obtain by reduction of $TiCl_4$ with organoaluminic compounds, a product which exhibits improved catalytic properties.

According to this process, during a first step, titanium tetrachloride is reduced by means of a hydride or an organometallic compound whereof the metal is chosen from Group I, II or III, in a solvent of low, normal boiling point (for example lower than 140° C.) and consequently low viscosity, at temperatures lower than about 50° C. (preferably between —30 and +30° C.); this solvent of low boiling point is thereafter replaced by a solvent of high normal boiling point (preferably higher than 140° C.), for example by distillation or decantation, so as to continue the reduction, during the second step, in the presence of the said high boiling solvents, at a temperature higher than 75° C. The resulting product exhibits outstanding catalytic properties.

The catalytic activity of the thus obtained $TiCl_3$ is higher than that of the product manufactured in one single solvent for the two steps.

According to this process, the first part of the reduction may be carried out in a solvent of low boiling point and viscosity, whereas the second step may be carried out in a high boiling solvent at high temperatures, for example between 100 and 200° C., preferably between 140 and 180° C. at atmospheric pressure, although other pressures may be used.

As solvent of low boiling point, a saturated hydrocarbon of, for example, 4 to 8 carbon atoms per molecule will be preferred, for example, butane, hexane, heptane, octane, isooctane or cyclohexane, more particularly a solvent boiling normally between 0 and 100° C. As solvent of high boiling point, a saturated hydrocarbon of 9 to 20 carbon atoms per molecule will be preferred, for example decahydronaphthalene, hexadecane, dodecane, Vaseline oil, more particularly a solvent of normal boiling point between 150 and 250° C. Mixtures of these hydrocarbons may also be used.

This process makes possible not only to separate $TiCl_4$ and the unreacted organoaluminic compounds, but also to improve the purity of $TiCl_3$ (thus to improve its catalytic activity), by the elimination of the haloorganoaluminum compound resulting from the reaction.

As preferred reducing compounds, the following may be named: $AlR_1R_2R_3$, $AlR_1R_2X_1$, $AlR_1X_1X_2$ $$Al_2R_1R_2R_3X_1X_2X_3$$

$AlR_1(OR_2)(OR_3)$, $Al(OR_1)R_2X$, $AlR_1R_2(OR_3)$ $AlHR_1R_2$ or $AlH_2R_1$ or aluminum hydrides also containing other elements such as alkali metals. $R_1$, $R_2$ and $R_3$ are monovalent hydrocarbon radicals, for example alkyl, aryl, alkaryl, aralkyl, alkenyl, alkynyl, cycloalkyl and cycloalkenyl and $X_1$, $X_2$ and $X_3$ are identical or different halogen atoms, preferably Br or Cl. As a rule, it is possible to use all compounds containing at least one H-metal or C-metal bond, the metal being selected from those of Groups I to III of the Periodic Chart.

Preferably each of the R radicals contains 1 to 30 carbon atoms.

The reduction of $TiCl_4$ to $TiCl_3$ is preferably carried out with atomic ratios Al/Ti between 0.2 and 0.6.

During the polymerization of propylene, the use of trialkylaluminum as activator makes possible to obtain very high reaction rates, however difficult to control, and the obtained polymers have a low isotactic content. It is then usually preferable to activate titanium trichloride by means of compounds of general formula $AlR_1R_2X_1$ so as to obtain a high content of isotactic polymer and a great catalytic activity.

It has been surprisingly discovered that, for polymerizing propylene, titanium trichloride, such as prepared according to this invention, and activated by $AlR_1R_2X_1$, has an outstanding catalytic activity (as measured, for example, in grams of polymer per gram of $TiCl_3$ and per hour of reaction).

This great catalytic activity also permits to lower polymerization temperature and pressure while obtaining sufficient yields, to diminish the amount of catalyst to be used for the polymerization and to obtain a polymer as a very fine powder which is more easily purified from the catalytic residues.

There will be described hereafter the process of manufacture of $TiCl_3$ and the results of a given number of polymerization trials which are given by way of examples. Examples 4 and 5 are given by way of comparison and form no part of this invention.

EXAMPLE 1

Manufacture of titanium trichloride

Into a reaction vessel of 1 liter capacity, which is fit with a stirrer of 200 rotations per minute and a cooler, 130 cm.³ of a solution are introduced which contain 0.18 mole of titanium tetrachloride in heptane. This solution is kept at 0° C. under stirring and 123 cm.³ of a solution of 0.099 mole of $Al(C_2H_5)_3$ in heptane are introduced therein in the course of 45 minutes. The vessel which contained $Al(C_2H_5)_3$ is rinsed with 10 cm.³ of heptane which are thereafter introduced into the reaction vessel. The molar ratio of $Al(C_2H_5)_3$ to $TiCl_4$ is 0.55.

The resulting mixture is thereafter heated up to 150° C. in the course of 45 minutes. During the heating from 0 to 150° C., heptane is removed by distillation. The distilled heptane is progressively replaced by the same volume of decahydronaphthalene before the temperature has attained 150° C. The stirred mixture is maintained for one hour at the latter temperature. After cooling to room temperature, the vessel is emptied and titanium trichloride is centrifuged and washed several times with heptane. It is thereafter suspended in heptane.

Propylene is polymerized with the resulting titanium trichloride in the following conditions:

Heptane: 600 ccm.
$TiCl_3$: 0.9 g.
$Al(C_2H_5)_2Cl$: 3.72 g.
Temperature: 50° C.
Pressure: 385 mm. Hg After 5 hours, the polymerization is stopped by means of alcohol containing hydrochloric acid. The gaseous propylene is vaporized and, after cooling, the polymer is washed with diluted ammonia. Finally the resulting polypropylene is dried under vacuum. 78 g. of polypropylene are thus obtained, i.e. an hourly production of 17 g. of polymer per gram of $TiCl_3$.

The content of isotactic polymer is 90% as determined from the residue of an extraction with heptane for 24 hours.

EXAMPLE 2

$TiCl_3$ is manufactured by the process described in Example 1, except that the first step temperature (reduction of $TiCl_4$ by $Al(C_2H_5)_3$) is 10° C.

Propylene is polymerized as described in Example 1, however with the catalyst of Example 2, and similar results are obtained.

EXAMPLE 3

$TiCl_3$ is manufactured with the same method and under the same conditions as in Examples 1 and 2 except that the temperature in the reaction step where $TiCl_4$ is reduced by $Al(C_2H_5)_3$ is 20° C.

Propylene is polymerized in the same conditions as those of Examples 1 and 2. The results are given in Table I.

EXAMPLES 4 AND 4a

By way of comparison, $TiCl_3$ is manufactured with heptane as sole solvent for the two steps of the reaction. The concentrations of reactants and the reaction temperature are the same as in Example 1. The second step is also carried out under a pressure which is close to the vapor pressure of heptane.

The obtained $TiCl_3$ is subjected to the same washing treatments as described in Example 1.

EXAMPLE 5 AND 5a

There is used decahydronaphthalene as solvent during the reduction of $TiCl_4$ by means of $Al(C_2H_5)_3$. This solvent exhibits a somewhat higher viscosity and boiling point.

This solvent is retained as hydrocarbon medium for the second step (heating to 150° C.).

The concentration of the reactants and the reaction temperature are as described in Example 1. The obtained material is washed with heptane and suspended in the same.

The resulting $TiCl_3$, as well as those of the previous examples, have given the following results (Table I).

TABLE I

| Example | Grams of— $TiCl_3$ | Grams of— $Al(C_2H_5)_2Cl$ | Temp., (° C.) | Pressure, mm. Hg. | Time, hours | Activity, g./g. Ti/h. | Isotacticity, percent | Intrinsic viscosity [1] |
|---|---|---|---|---|---|---|---|---|
| 1 | 0.9 | 3.72 | 50 | 385 | 5 | 17 | 90 | 5.5 |
| 2 | 0.9 | 3.72 | 50 | 385 | 5 | 15.6 | 93 | 5.8 |
| 3 | 0.9 | 3.72 | 50 | 385 | 5 | 13.8 | 94 | 6 |
| 4 | 0.92 | 3.72 | 50 | 395 | 5 | 13 | 87 | 4 |
| 4a | 0.92 | 3.72 | 50 | 385 | 5 | 12 | 88 | 3.8 |
| 5 | 1.47 | 6 | 50 | 400 | 5 | 9.4 | 89 | 3.5 |
| 5a | 1.47 | 6 | 50 | 385 | 5 | 9.65 | 88 | 3.8 |

[1] At 135° C. in tetrahydronaphthalene.

EXAMPLE 6

TiCl$_3$ is manufactured as described in Example 1, except that pentane is used instead of heptane.

Propylene is polymerized with this catalyst under the conditions of Example 1.

After 5 hours, 65 g. of polymer are obtained whereof the isotacticity is 90% and the intrinsic viscosity ($\eta$) is 5.5 (as determined at 135° C. in tetrahydronaphthalene).

EXAMPLES 7 TO 16

TiCl$_3$ is manufactured as described in Example 1, however with some changes. The conditions other than those of Example 1 are given in Table II.

TABLE II

| Example | 1st step solvent | Reducing agent | Temperature (° C.) 1st step | Temperature (° C.) 2d step | 2d step solvent |
|---|---|---|---|---|---|
| 7 | Hexane | AlCl(C$_2$H$_5$)$_2$ | 0 | 150 | Decahydronaphthalene. |
| 8 | Octane | AlCl$_2$C$_2$H$_5$ | −10 | 160 | Hexadecane. |
| 9 | Cyclohexane | Al$_2$Cl$_3$(C$_2$H$_7$)$_3$ | 0 | 160 | Do. |
| 10 | Butane | AlBr(C$_3$H$_7$)$_2$ | 0 | 120 | Dodecane |
| 11 | Heptane | Zn(C$_2$H$_5$)$_2$ | 0 | 140 | Do. |
| 12 | Pentane | Mg(CH$_3$)$_2$ | 10 | 180 | Vaseline oil. |
| 13 | Heptane | MgBrC$_6$H$_5$ | 20 | 160 | Do. |
| 14 | do | AlH(C$_2$H$_5$)$_2$ | 0 | 150 | Mixture of hexadecane with dodecane by equal volumes. |
| 15 | do | AlH$_2$C$_2$H$_5$ | 0 | 150 | Do. |
| 16 | do | Al(OC$_2$H$_5$)$_2$C$_2$H$_5$ | 0 | 150 | Decahydronaphthalene. |

Propylene is thereafter polymerized under the conditions of Example 1 with each of the TiCl$_3$ obtained in Examples 7 to 16. The results are substantially the same as in Example 1.

What is claimed is:

1. A process for producing titanium trichloride by the reduction of titanium tetrachloride which comprises reducing titanium tetrachloride in a first stage with an organometallic compound selected from the group consisting of AlH$_3$, AlR$_1$R$_2$R$_3$, AlR$_1$R$_2$X$_1$, AlR$_1$X$_1$X$_2$, Al$_2$R$_1$R$_2$R$_3$X$_1$X$_2$X$_3$, AlR$_1$(OR$_2$)(OR$_3$), Al(OR$_1$)R$_2$X, AlR$_1$R$_2$(OR$_3$), AlHR$_1$R$_2$ and AlH$_2$R$_1$, wherein R$_1$, R$_2$ and R$_3$ are monovalent hydrocarbon radicals containing from 1 to 30 carbon atoms and X$_1$, X$_2$ and X$_3$ are identical or different halogens, at a temperature of about −30 to +30° C. in the presence of a low boiling saturated hydrocarbon solvent or a mixture of low boiling saturated hydrocarbon solvents having about 4 to 8 carbon atoms, and boiling at a temperature between about 0 to 100° C., replacing said low boiling solvent with a high boiling saturated hydrocarbon solvent or a mixture of high boiling saturated hydrocarbon solvents having about 9 to 20 carbon atoms and boiling at a temperature between about 150 to 250° C. and continuing the reduction in a second stage at a temperature of about 100 to 200° C. in the presence of said high boiling solvent.

2. The process of claim 1, wherein the second stage is conducted at a temperature of 140 to 180° C.

3. The process of claim 1, wherein the atomic ratio of Al/Ti of the aluminum compounds to the titanium tetrachloride is between about 0.2 and 0.6.

4. The process of claim 1, wherein the first stage solvent is progressively replaced by the second stage solvent during the removal of the first solvent.

5. The process of claim 1, wherein the organometallic compound is selected from the group consisting of Al(C$_2$H$_5$)$_3$, AlCl(C$_2$H$_5$)$_2$, AlCl$_2$C$_2$H$_5$, Al$_2$Cl$_3$(C$_2$H$_5$)$_3$, AlBr(C$_3$H$_7$)$_2$, AlH(C$_2$H$_5$)$_2$, AlH$_2$C$_2$H$_5$ and Al(OC$_2$H$_5$)$_2$C$_2$H$_5$.

6. A process for producing titanium trichloride by the reduction of titanium tetrachloride which comprises reducing titanium tetrachloride in a first stage with an organometallic compound selected from the group consisting of AlH$_3$, AlR$_1$R$_2$R$_3$, AlR$_1$R$_2$X$_1$, AlR$_1$X$_1$X$_2$, Al$_2$R$_1$R$_2$R$_3$X$_1$X$_2$X$_3$ AlR$_1$(OR$_2$)(OR$_3$), Al(OR$_1$)R$_2$X, AlR$_1$R$_2$(OR$_3$), AlHR$_1$R$_2$ and AlH$_2$R$_1$, wherein R$_1$, R$_2$ and R$_3$ are monovalent hydrocarbon radicals containing from 1 to 30 carbon atoms and X$_1$, X$_2$ and X$_3$ are identical or different halogens, at a temperature of about −30 to +30° C. in the presence of a low boiling saturated hydrocarbon solvent having a boiling point between about 0 and 100° C., progressively removing the low boiling solvent during a second stage by distillation and replacing it with a high boiling saturated hydrocarbon solvent having a boiling point between about 150 and 250° C. and continuing the reduction in said second stage at a temperature of about 100 to 200° C. in the presence of said high boiling solvent.

7. The process of claim 6, wherein the atomic ratio Al/Ti of the aluminum compounds to the titanium tetrachloride is between about 0.2 and 0.6.

8. A process for polymerizing $\alpha$-olefinic hydrocarbons which comprises contacting said olefinic hydrocarbons with a titanium trichloride catalyst produced by reducing titanium tetrachloride in a first stage with an organometallic compound selected from the group consisting of AlH$_3$, AlR$_1$R$_2$R$_3$, AlR$_1$R$_2$X$_1$, AlR$_1$X$_1$X$_2$, Al$_2$R$_1$R$_2$R$_3$X$_1$X$_2$X$_3$ AlR$_1$(OR$_2$)(OR$_3$), Al(OR$_1$)R$_2$X, AlR$_1$R$_2$(OR$_3$), AlHR$_1$R$_2$ and AlH$_2$R$_1$, wherein R$_1$, R$_2$ and R$_3$ are monovalent hydrocarbon radicals containing from 1 to 30 carbon atoms and X$_1$, and X$_2$ and X$_3$ are identical or different halogens, at a temperature of about −30 to +30° C. in the presence of a low boiling saturated hydrocarbon solvent or a mixture of low boiling saturated hydrocarbon solvents having about 4 to 8 carbon atoms, and boiling at a temperature between about 0 to 100° C., replacing said low boiling solvent with a high boiling saturated hydrocarbon solvent or a mixture of high boiling saturated hydrocarbon solvents having about 9 to 20 carbon atoms and boiling at a temperature between about 150 and 250° C. and continuing the reduction in a second stage at a temperature of about 100 to 200° C. in the presence of said high boiling solvent, said catalyst being activated with an organometallic compound of the formula AlR$_1$R$_2$X$_1$ where R$_1$ and R$_2$ are monovalent hydrocarbon radicals and X$_1$ is a halogen atom.

9. The process of claim 8, wherein the $\alpha$-olefinic hydrocarbon is propylene.

10. A process for polymerizing $\alpha$-olefinic hydrocarbons which comprises contacting said olefinic hydrocarbons with a titanium trichloride catalyst produced by reducing titanium tetrachloride in a first stage with an organometallic compound selected from the group consisting of $AlH_3$, $AlR_1R_2R_3$, $AlR_1R_2X_1$, $AlR_1X_1X_2$, $Al_2R_1R_2R_3X_1X_2X_3$, $AlR_1(OR_2)(OR_3)$, $Al(OR_1)R_2X$, $AlR_1R_2(OR_3)$, $AlHR_1R_2$ and $AlH_2R_1$, wherein $R_1$, $R_2$ and $R_3$ are monovalent hydrocarbon radicals containing from 1 to 30 carbon atoms and $X_1$, $X_2$ and $X_3$ are identical or different halogens, at a temperature of about $-30$ to $+30°$ C. in the presence of a low boiling saturated hydrocarbon solvent having a boiling point between about 0 and 100° C., progressively removing the low boiling solvent during a second stage by distillation and replacing it with a high boiling saturated hydrocarbon solvent having a boiling point between about 150 and 250° C. and continuing the reduction in said second stage at a temperature of about 100 to 200° C. in the presence of said high boiling solvent, said catalyst being activated with an organometallic compound of the formula $AlR_1R_2X_1$ where $R_1$ and $R_2$ are monovalent hydrocarbon radicals and $X_1$ is a halogen atom.

11. The process of claim 10, wherein the organometallic compound used to activate said titanium trichloride catalyst is $Al(C_2H_5)_2Cl$.

References Cited
UNITED STATES PATENTS

| | | | |
|---|---|---|---|
| 2,999,086 | 9/1961 | Fasce et al. | 260—93.7 |
| 3,058,970 | 10/1962 | Rust et al. | 260—93.7 |
| 3,063,798 | 11/1962 | Langer et al. | 23—87 |
| 3,135,702 | 6/1964 | Vries et al. | 252—429 |
| 3,108,973 | 10/1963 | Vandenberg | 252—429 |

JOSEPH L. SCHOFER, Primary Examiner

E. J. SMITH, Assistant Examiner

U.S. Cl. X.R.

23—87; 252—429, 441; 260—94.9 B, 94.9 E